Patented Dec. 18, 1945

2,391,013

UNITED STATES PATENT OFFICE 2,391,013

PHYSIOLOGICALLY ACTIVE ALKALOIDS FROM ERYTHRINA SPECIES

Karl Folkers, Plainfield, and Frank Koniuszy, Elizabeth, N. J., assignors to Merck & Co., Inc., Rahway, N. J., a corporation of New Jersey No Drawing. Application July 3, 1940, Serial No. 343,854

16 Claims. (Cl. 260—236)

This invention relates to alkaloids having important physiological activity, and to processes for their production from the various species of Erythrina.

The alkaloids which applicants have produced for the first time from species of Erythrina cause, physiologically, a potent curare-like action and certain of them have been found particularly useful for the release of spasm and plastic muscular rigidity in patients with spastic paralysis and for the modification of the severity of the metrazol convulsions, thereby preventing fractures in the convulsive therapy of the psychoses.

Generally, plant alkaloids occur in the form of salts of acids such as malic, oxalic, succinic, tannic, or other vegetable acids. In some instances, plant alkaloids occur as salts of special acids, for example, aconitine occurs chiefly in combination with aconitic acid; the opium alkaloids occur largely with meconic acid; the cinchona alkaloids occur with quinic acid, etc. The occurrence of plant alkaloid salts of inorganic acids is not infrequent, thus morphine occurs naturally in opium in part as morphine sulfate (see Allen's Commercial Organic Analysis, fifth edition, vol. 7, page 2, Blakiston's Son & Co. Inc., Philadelphia).

The known methods for the production of plant alkaloids are based upon the fact that the alkaloids do occur in the form of salts of organic or inorganic acids. Such known processes involve the following general steps:

(A) Extracting the alkaloidal salts with a suitable solvent such as alcohol, water, etc.;
(B) Conversion of the alkaloidal salts in such solution with an alkalinizing agent such as lime, magnesia and sodium hydroxide;
(C) Extraction of the alkaloidal bases with a solvent.

Modifications of these general steps may be practiced. Thus, steps (A) and (B) may be reversed and these steps may involve numerous sub-steps such as the removal of resins, coloring matter, fats, etc. Further, certain exceptions in these general steps may be practiced such as the use of precipitants for soluble alkaloids not removed by immiscible solvents, and distillation for volatile alkaloids, such as nicotine (see Henry, "The Plant Alkaloids," second edition, page 6, Churchill, London, 1924).

After it was discovered that alkaloids which exhibit the physiological action of curare could be produced from species of Erythrina, the known processes for the production of plant alkaloids were reviewed. In view of the complex and labile or sensitive nature of many of the Erythrina alkaloids, and the complex mixture in which they occur, it was necessary to devise carefully controlled and especially adapted processes for their production. Important modifications had to be made in the known processes.

When seeds or parts of plants of the species of Erythrina are extracted with water, alcohol, etc. (after first having removed the fats), a crude extract is obtained which contains alkaloids which have a high paralysis potency. When this extract is made slightly alkaline and is extracted with a solvent immiscible in water such as chloroform, a crude active alkaloidal fraction is obtained which has a curare-like action. This is called the "free" alkaloidal fraction. From this fraction, a number of individual alkaloids have been isolated and identified such as $\alpha$- and $\beta$-erythroidine, erythraline, erythramine and erythratine.

After the "free" alkaloidal fraction had been obtained, it was then found, surprisingly, that the Erythrina seeds contained not only the "free" alkaloidal fraction, but also other new alkaloids which have been called the "combined" alkaloids because they have been found to be combined with an acid through an ester linkage. These new combined alkaloids appear to be esters of sulfoacetic acid, $HO_3SCH_2CO_2H$, and new alkaloidal molecules. This is evidenced by the fact that acid or alkaline hydrolysis of the new "combined" alkaloids yields two fragments in each case, the sulfoacetic acid, and the alkaloidal portion which has been called the "liberated" alkaloid. To the applicant's knowledge such "combined" alkaloids are without parallel in alkaloid chemistry. These new alkaloidal esters of sulfoacetic acid exhibit the physiological action of curare, and likewise, the valuable property of forming soluble sodium salts which renders them suitable for injection.

The presence of the "combined" alkaloids in the seeds of Erythrina was entirely unexpected and was discovered in connection with physiological tests with solutions of extracts obtained from the seeds. Thus, when seeds of Erythrina berteroana Urb. (Benitez 9159) were extracted with petroletum ether to remove fats, and then with alcohol and the alcohol extractives dissolved in a definite volume of water, the aqueous solution was found to be active at the threshold dose of 0.5 ml./kg. frog for curare-like action, when injected intralymphatically. When the solution was weakly alkalinized with sodium bicarbonate, exhaustively extracted with chloroform to remove the "free" alkaloidal fraction, neutralized, chloroform removed, and retested on frogs, it was found to be still active at 0.5 ml./kg. The "free" alkaloidal fraction was dissolved in water at the concentration of the original solution and found to be active at 2.0 ml./kg. Therefore, the original threshold dose was not a measure of the activity of the "free" alkaloidal fraction, but rather that of a second very water-soluble fraction which was more active. The solution exhausted of the "free" fraction was acidified with hydrochloric acid and refluxed. After cooling, treating with sodium bicarbonate and extracting with chloroform, a new fraction of hydrolyzed or "liberated" alkaloid bases was obtained. The residual aqueous solution, properly adjusted as to pH was now one-tenth as active in frogs and the new "liberated" fraction showed activity upon testing.

The procedure described immediately above was also applied to an extract of seeds of Erythrina glauca Willd. (Haigh 9170). The aqueous solution obtained was active at the threshold dose of 0.04 ml./kg. After the "free" alkaloidal fraction was removed, the solution showed a residual potency of T. D. 0.05 ml./kg. and after acid hydrolysis the residual potency was reduced to 2.0 ml./kg. It was then apparent that the seeds contained, in addition to the "free" alkaloid fraction, a second fraction in which the physiologically active nitrogen-containing molecules are chemically bound in such manner as to make them very water-soluble and substantially insoluble in immiscible organic solvents, such as chloroform. These are the "combined" alkaloids previously mentioned.

A definite system of nomenclature has been adopted for naming the new alkaloids which applicants and their co-workers have produced from Erythrina species. Thus, the active fraction which could be obtained directly from the plant extracts, by making an aqueous solution of the latter weakly alkaline (sodium bicarbonate) and extracting, has been termed the "free" alkaloidal fraction and the alkaloids obtained therefrom are called "free" alkaloids. The stem "erythr-" has been reserved for use in naming the individual alkaloids obtained from this free fraction as, for example, erythroidine, erythramine, etc. The alkaloids remaining in the aqueous solution after extraction of the "free" fraction have been termed "combined" alkaloids, for which the root "erysothio-" has been reserved for their nomenclature, as for example, erysothiovine and erysothiopine. These alkaloids are named to indicate the nature of the acid with which they are combined and the alkaloids which they give on hydrolysis. The alkaloids obtained from the "combined" fraction or from the "combined" alkaloids by hydrolysis of the sulfoacetic acid group are termed the "liberated" alkaloids and the stem "eryso-" is reserved for use in naming them as, for example, erysocine, erysovine, erysopine and erysodine.

The relationship existing in this complex group of alkaloids is clearly indicated in the following chart:

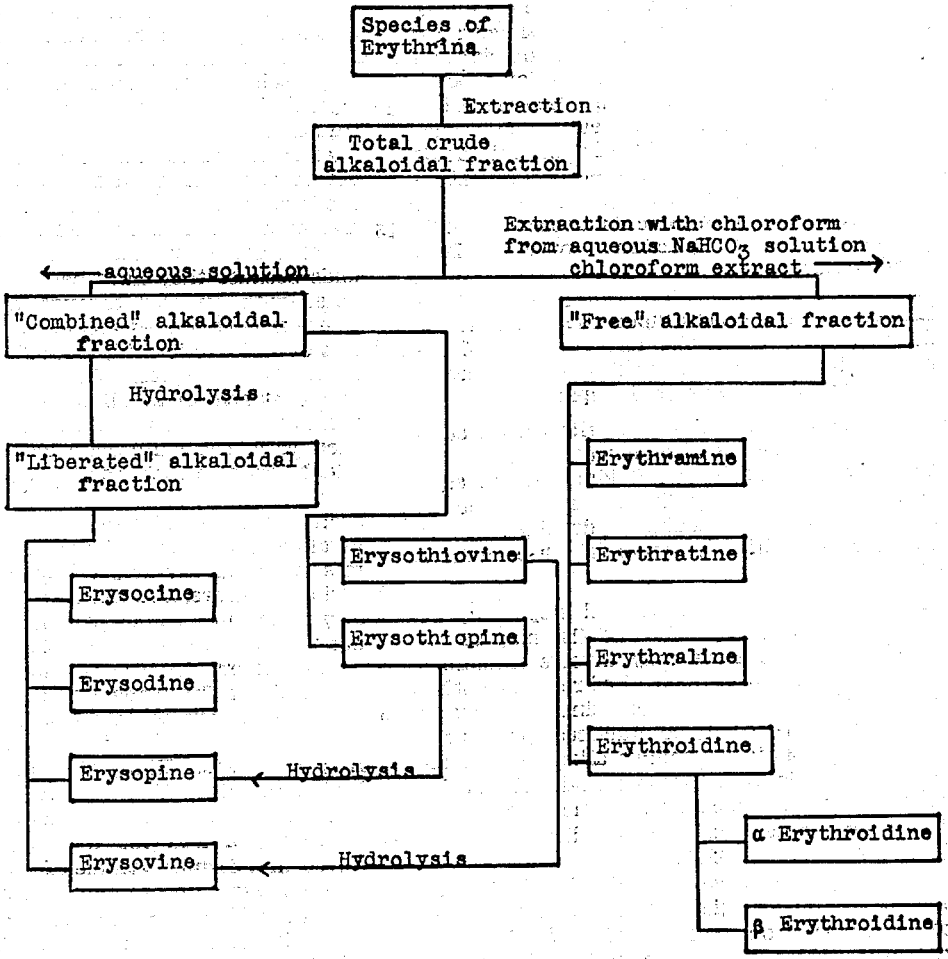

The physical constants of the alkaloids described in this application are shown in Table I:

Table I

| Alkaloid | M. P. | (α) | Empirical formula |
| --- | --- | --- | --- |
| Combined alkaloids: | | | |
| Erysothiopine | 168–9 | +194. | $C_{19}H_{21}NO_7S \cdot H_2O$ |
| Erysothiovine | 187 dec. | +208.5 | $C_{20}H_{23}NO_7S$ |
| Liberated alkaloids: | | | |
| Erysocine | 160–1 | +238. | $C_{18}H_{21}NO_3$ |
| Erysodine | 204–5 | +248. | $C_{18}H_{21}NO_3$ |
| Erysopine | 241–2 | +265. | $C_{17}H_{19}NO_3$ |
| Erysovine | 178–9.5 | +252. | $C_{18}H_{21}NO_3$ |

*Production of the "free" alkaloidal fraction from seeds of species of Erythrina*

The "preferred" procedure by which the "free" alkaloids of species of Erythrina are obtained comprises the following general steps, briefly described, particularly as applied to the seeds:

(1) Extraction of the seeds to remove fats.

(2) Extraction of the total "free" and "combined" alkaloids with a solvent such as methyl or ethyl alcohol.

(3) Distillation of the alcohol solution to dryness and dissolving of the residue in water.

(4) Clarification of the aqueous solution by weakly acidifying and extracting with petroleum ether and then with chloroform to remove traces of fats. This operation must be carried out carefully.

(5) Alkalinization of the clarified aqueous solutions with a weak alkalinizing agent.

(6) Extraction of the weakly or slightly alkalinized aqueous solution with chloroform which removes the "free" alkaloidal fraction and thus separates the "free" and "combined" alkaloidal fractions. The "preferred" process for the production of the "free" alkaloidal fraction is disclosed in co-pending application S. N. 180,143, filed December 16, 1937. Throughout this specification, wherever we refer to the "preferred" method it is intended to indicate that the "free" alkaloidal fraction has been removed from the Erythrina seeds without prior separation of hypaphorine.

The subsequent treatment of the "free" alkaloidal fraction to produce the individual "free" alkaloids is disclosed in copending applications, Serial Numbers 232,234 filed September 28, 1938; 273,366 filed May 12, 1939; 316,718 filed February 1, 1940 and 233,412 filed October 5, 1938.

Certain variations may be practiced in carrying out this general process. Thus, for example:

(a) Step 1 may be omitted and the fats taken out at step 4 in the process. This is not entirely satisfactory because the mixture obtained is very difficult to manipulate.

(b) The extraction at step 2 may be carried out with water in which case step 3 may be omitted. However, this is not desirable because water extracts much extraneous material and subsequent filtrations and solvent extractions are more difficult.

(c) The alkaloid, hypaphorine, occurs in species of Erythrina and can be removed by acidifying the extract remaining after step 4, concentrating to a small volume and refrigerating whereupon the hypaphorine salt crystallizes out. The process wherein hypaphorine is removed before the "free" fraction, is called the "alternative" procedure. This procedure requires that the solution be kept in an acid condition for considerable time. Since some of the "combined" alkaloids hydrolyze very readily and, if hydrolyzed, the "liberated" alkaloids contaminate the free fraction subsequently obtained, the use of this alternative procedure is not recommended. This point is further emphasized by the fact that some species of Erythrina contain 5 to 10 times as much "combined" as "free" alkaloids and a slight hydrolysis in these cases may form an amount of "liberated" alkaloid equal to the amount of the "free" fraction. The "alternative" process for the production of the "free" alkaloidal fraction is described in co-pending application S. N. 221,569 filed July 27, 1938. The use of the "preferred" procedure gives a more accurate estimate of the amount of free alkaloids, because the opportunity for hydrolysis of the "combined" alkaloids is minimized.

Throughout this application, whenever we refer to the "alternative" procedure, it is intended to indicate that the "free" fraction has been produced from the Erythrina seeds after intermediate isolation of hypaphorine.

*Production of the "combined" alkaloids from seeds of species of Erythrina*

The "combined" alkaloids may be produced from the Erythrina seeds after isolation of the "free" fraction, and this may be accomplished by allowing the neutralized liquor of the "free" fraction extraction to stand at room temperature or lower, to permit crystallization of the "combined" alkaloids. Also, the "combined" alkaloids may be produced directly from the Erythrina seeds. Such a procedure involves the following general steps which are briefly described:

(1) Extraction of the seeds to remove fats;

(2) Extraction of the total "free" and "combined" alkaloids with a solvent such as methyl or ethyl alcohol;

(3) Distillation of the alcohol solution to dryness and dissolving of the residue in water;

(4) Clarification of the aqueous solution by centrifugation, or by extraction with petroleum ether and then chloroform.

(5) Covering the solution with a layer of petroleum ether to prevent mold formation, and allowing the solution to stand for a prolonged period at room temperature, or refrigerating for a shorter period, to permit crystallization of the "combined" alkaloids.

Since the "combined" alkaloids (sulfoacetic acid esters) are not extracted by organic solvents from aqueous solution, and since they contain an acid group which forms a salt in sodium bicarbonate solution, there is double reason why they are not isolated in conjunction with the "free" alkaloidal fraction by the general processes described. Because the alkaloidal portions of the sulfoacetic esters form weak acid salts in inorganic acid (hydrochloric acid) solutions, due to the presence of the nitrogen atom in the alkaloidal moiety, they do not possess the property of being extracted from acid solution by organic solvents. Furthermore, it has not been found practicable to precipitate the "combined" alkaloids from aqueous solutions of the alcohol extractives of the seeds, by the use of such precipitating reagents as phosphotungstic acid. It was found that the use of such precipitating agents resulted in the simultaneous precipitation of all three of the alkaloidal fractions present in Erythrina seeds, i. e., (1) the "free" alkaloidal fraction, (2) the "combined" alkaloids, and (3) hypaphorine. Chemical separation of this very complex mixture cannot be achieved satisfactorily. It was also found to be impracticable to precipitate the "combined" alkaloids after removal of the "free" fraction, since it was not possible to effect complete separation of the hypaphorine phosphotungstate and the "combined" alkaloid phosphotungstates.

Production of the "liberated" alkaloids from seeds of species of Erythrina

The total "combined" alkaloids present in the liquors from the "free" alkaloid fraction extraction may be subjected to acid or alkaline hydrolysis for the production of the total "liberated" alkaloid fraction, from which the individual "liberated" alkaloids may be obtained. Also, the individual "combined" alkaloids such as erysothiovine or erysothiopine, for example, may be isolated, and then hydrolyzed to the individual "liberated" alkaloids by acid or alkali medium.

The production of the "liberated" alkaloids directly from the aqueous residual solution of the "free" alkaloid extraction containing the "combined" alkaloids involves the following general steps:

(1) Acid hydrolysis of the aqueous solution remaining after the extraction of the free fraction for the purpose of splitting off the sulfoacetic acid. (However, if it is desired to obtain the combined alkaloids, the neutralized solution is allowed to stand at room temperature or lower to permit crystallization and removal.)
(2) Alkalinization with a weak alkalinizing agent.
(3) Extraction of the alkalinized solution with chloroform to obtain the "liberated" alkaloidal fraction.
(4) Concentration of the chloroform extract to dryness.
(5) Crystallization or fractional crystallization of the crude "liberated" alkaloidal fraction to obtain pure individual "liberated" alkaloids.

Certain variations may be practiced in carrying out this general process. Thus, the hydrolysis of step 1 is preferably done with acid. For some species the period of hydrolysis may be as short as 5 minutes. For others a longer period up to several hours is necessary, which may be carried out in relatively short successive treatments, or in some cases, by continuous treatment with acid or alkali. However, the use of alkali is not as desirable as the use of acid because it leads to tar formation and causes the decomposition of hypaphorine (if present) giving rise to trimethylamine and indole.

It is possible to introduce other variations into the general processes due to the fact that species of Erythrina vary considerably in the relative amounts of "free" and "combined" alkaloidal fractions contained in them and in the relative amounts of individual alkaloids present. In some species a single alkaloid may predominate in the "free" alkaloidal fraction as, for example, erythroidine in the species *E. berteroana*, and *E. poeppigina*, and erythramine in the species *E. sandwicensis*. Likewise, in some species of Erythrina a single alkaloid may predominate in the "combined" and "liberated" fractions, as, for example, erysothiovine and erysovine in *E. Berteroana*.

From the article by one of the present applicants, Folkers, and another, in J. Amer. Pharm. Assoc., vol. 28, p. 1019, December 1939, it will be seen that the various species of Erythrina are divided into groups and sub-groups throughout the genus. In order to determine the presence of any desired alkaloid, one may select the species illustrated in the examples given, or a closely related species (see the literature reference) since it appears that closely related species frequently contain substantially the same alkaloids. For example, the new "liberated" alkaloids, erysodine, erysocine, erysopine, and erysovine disclosed herein are widely distributed in the genus Erythrina and have been obtained from sources indicated in the following table by positive sign.

*Table II*

| Plant | Alkaloid | | | |
|---|---|---|---|---|
| | Erysodine | Erysopine | Erysocine | Erysovine |
| *E. abyssinica* Lam | + | + | | |
| *E. sandwicensis* Deg | + | + | + | + |
| *E. glauca* Willd | + | + | | |
| *E. berteroana* Urb | | | | + |
| *E. americana* Mill | | | + | |
| *E. poeppigiana* Walp. O. F. Cook | + | | + | + |
| *E. herbacea* L | + | | | |
| *E. flabelliformis* Kearney | + | + | + | + |

Thus, if it is desired to produce a particular "liberated" alkaloid, the species of Erythrina from which the alkaloid was obtained, as shown by the table, is selected for treatment as disclosed herein, or a closely related species as shown in the above mentioned literature reference may be examined to determine whether or not the desired alkaloid may be obtained.

Methods by which the "free" fraction, the "combined" alkaloids, and/or the "liberated" alkaloids may be produced are illustrated in the following examples. It is to be understood that these examples are based upon the experiments conducted for the identification of the new hitherto unknown "combined" and "liberated" alkaloids. The actual processes disclosed in the examples may be modified in various respects, without departing from the spirit and scope of the invention.

As has been disclosed above, the new "combined" alkaloids may be produced directly from the Erythrina seeds. Such procedure is illustrated in Examples I to IV:

Example I 12 kg. of finely powdered seeds of *E. glauca* Willd. Wortley 9242, were extracted for 21 hours with petroleum ether to remove the fatty portion. The remaining seed powder was extracted for 98 hours with absolute methanol, the solvent removed in vacuo, and the alcohol extractives remaining were dissolved in water to make a total volume of 6 liters. One liter of that solution was treated to remove any residual oil droplets by means of centrifuging. Clarification at this point may also be accomplished by means of extraction with petroleum ether and chloroform. The clear green-colored solution was then covered with a layer of petroleum ether to prevent mold formation and allowed to stand at room temperature for about 3 months. Refrigeration at this point hastens crystallization. Approximately one gm. of crystals separated. The crystals were filtered, washed with 10 ml. of cold water and dried in vacuo. The crystals decomposed at about 183–186° C. recrystallization from hot water gave short white needles melting at about 187° C. (with decomposition). The recrystallized product showed $(\alpha)_D^{25} = +208.5$, absolute alcohol. The product was difficulty soluble in water, soluble in dilute acids, and soluble in dilute sodium hydroxide solution. The alkaloid gave the usual alkaloid precipitation tests except with Mayer's reagent. This new "combined" alkaloid was called erysothiovine.

Example II

The mother liquor of the erysothiovine extraction described in Example I was divided into three portions. One portion was concentrated to one-half volume in vacuo; the second was refluxed for about 15 minutes at its natural acidity; the third portion was not treated. All three portions were refrigerated for about a month, at the end of which time the portion which had been concentrated to one-half volume, did not produce any crystals. The other two portions yielded crystals melting at about 196–197° C. with decomposition. The total yield of crystals obtained was about 300 mg., which were found to be contaminated with crystals of a "liberated" alkaloid. Recrystallization from 95% ethanol removed the "liberated" alkaloid and gave a product melting at about 168–169° C., with decomposition. A further recrystallization did not change the melting point and the final yield was about 248 mg. The product showed $(\alpha)_D^{25} = +194.1$ absolute ethanol. This new "combined" alkaloid was called erysothiopine.

Example III 13 kg. of seed powder of E. poeppiginana Walp. Wortley 9241, were extracted for 21 hours with petroleum ether to remove the fatty portion. The seed powder was then extracted for 104 hours with absolute methanol. The solvent was removed from the alcohol extractives in vacuo and the residue dissolved in water to make a volume of approximately 46–50 ml. After standing for about a month in a refrigerator about 9.5 gms. of crystals were removed by filtration. These crystals were found to be identical with the crude erysothiovine isolated from seeds of E. glauca Willd. (Ex. I) since the product did not depress the mixed melting point (183° C.) and its optical rotation $(\alpha)_D^{25} = +206.6$ was the same as that of erysothiovine. Two recrystallizations from water gave a product of constant melting point of about 186–187° C. with decomposition and showed $(\alpha)_D^{25} = +208.3$, absolute alcohol.

Example IV 300 gms. of finely divided seeds of E. pallida, Britton & Rose (Wortley 9257) were extracted with petroleum ether for 5 hours to remove the fatty portion. The defatted seed powder was then extracted for 66 hours with absolute methanol and the alcohol extractives concentrated to dryness in vacuo. The residue thus obtained was dissolved in water, covered with a layer of petroleum ether, and placed in a refrigerator at 10° C. After about a month crystals separated and were filtered, washed with water and acetone, then dried in vacuo. The yield was about 22 mgs. of a product which gave physical constants identical with those of erysothiovine. The mixed melting point (183° C.) was not depressed and the observed rotation was $(\alpha)_D^{25} = +207$, absolute ethanol, while pure erysothiovine shows $(\alpha)_D = +208.5$. After standing in the cold for 11 months the mother liquor was filtered again. After washing with 10 ml. of cold water and 25 ml. of acetone, and drying in vacuo, about 540 mg. of crystals were obtained having a decomposition point of about 179–183° C. Two recrystallizations from water gave short white gleaming needles with the decomposition point of about 186–187° C. There was no depression in the mixed melting point with erysothiovine obtained in Ex. I and the product showed $(\alpha)_D^{25} = +208.4$.

As has been previously mentioned the individual "combined" alkaloids may be removed from the seeds of Erythrina after removal of the "free" alkaloidal fraction. That procedure is illustrated in Example V.

Example V

The 5 liter solution obtained in Ex. I and set aside temporarily, was acidified and clarified in the usual manner with petroleum ether and then with chloroform. It was then alkalinized with sodium bicarbonate and the solution extracted for 5 hours with chloroform. The "free" alkaloidal fraction was extracted by the chloroform and after removal of the solvent amounted to about 19.29 gms. The aqueous residual liquor was made neutral to litmus with hydrochloric acid and was subjected to cold for a prolonged period (about 4 months). About 6.5 gms. of erysothiovine crystallized and was filtered off. The crystals melted at about 182–183° C. and showed $(\alpha)_D^{28} = +207.9$, 50% alcohol. On recrystallization, the crystals melted at about 187° C. (dry) and showed $(\alpha)_D^{25} = +208.6$, 50% alcohol.

On acid or alkaline hydrolysis the "combined" alkaloids yield new "liberated" alkaloids. The hydrolysis may be effected in the residual liquor from the "free" alkaloid extractions or the "combined" alkaloids may be isolated and then subjected to the acid or alkaline hydrolysis. The following examples (VI and VII) illustrate the method of hydrolysis of the isolated individual "combined" alkaloids erysothiovine and erysothiopine, to yield respectively the new "liberated" individual alkaloids, erysovine and erysopine.

Example VI 300 mg. of erysothiovine were dissolved in 50 ml. of 2% hydrochloric acid and the solution was heated for 15 minutes. After cooling, the acidic solution was extracted with chloroform, and the extracts concentrated to dryness. Nothing was obtained. The acid solution was then made alkaline with sodium bicarbonate and extracted with 12 portions of 25 ml. of chloroform. When concentrated to dryness in vacuo, the chloroform residue amounted to about 178 mg. of a colorless gum. The gum was dissolved in 50 ml. of anhydrous ethyl ether, filtered, and concentrated to 10 ml. After scratching, white crystals formed which melted at about 177° C. The specific rotation was $(\alpha)_D^{25} = +252.8$, absolute alcohol. This new "liberated" alkaloid was called erysovine.

Example VII 87 mg. of erysothiopine were dissolved in 25 ml. of 1% hydrochloric acid and the solution refluxed for 14 minutes. After alkalinizing with sodium bicarbonate, extracting with chloroform, and concentrating the chloroform extract to dryness in vacuo, about 25 mg. of residue with the decomposition point of about 238° C. were obtained.

The product was recrystallized from absolute alcohol. Colorless crystals melting at about 240–241° C. were obtained. The product gave a deep green color when treated with dilute hydrochloric acid and ferric chloride solution, and showed rotation $(\alpha)_D^{25} = +264.6$. This new "liberated" alkaloid was called erysopine.

The following examples illustrate the method of producing the "liberated" alkaloid fraction from the "combined" alkaloids present in the residual liquor of the "free" alkaloid fraction extraction. The "free" alkaloid fraction may be removed by either the "preferred" method or by the "alternative" method. The examples also illustrate the production of several new individual "liberated" alkaloids, namely, erysodine, erysocine, erysopine and erysovine, from the "liberated" fraction obtained by acid or alkaline hydrolysis of the "combined" alkaloids in the residual liquor of the "free" alkaloid fraction extraction.

Example VIII

After the "free" alkaloidal fraction had been extracted with chloroform from an alkaline (sodium bicarbonate) solution 1255 ml. derived from about 3250 gms. of seeds of *E. sandwicensis* Deg. (L. W. Bryan 9160), the solution had been neutralized with hydrochloric acid for storage. In an acid solution the "combined" alkaloids slowly hydrolyze. In an alkaline solution, hypaphorine slowly decomposes to yield indole. A 100 ml. portion of the solution was made alkaline with sodium bicarbonate and extracted repeatedly (about 15 times) with chloroform. The solution did not contain any residual "free" alkaloids, since the first twelve extractions gave only negligible amounts of residue while the last three gave no residue at all. The solution was neutralized with hydrochloric acid and about 1 ml. of concentrated hydrochloric acid was added. After refluxing the solution for 5 minutes, it was cooled, alkalinized with sodium bicarbonate and extracted 10 times with chloroform. The yield of extractives was about 2.7 gms., melting point about 193–196° C. This was the "liberated" fraction. Longer treatment with acid does not materially effect the yield of "liberated" fraction obtained, but a somewhat more acidic condition resulted in an improvement in yield. Thus, when a 100 ml. portion of the neutralized solution remaining after separation of the "free" alkaloid fraction was acidified at the ratio of 2.5 ml./100 ml. solution, refluxed for 15 minutes, cooled, alkalinized with sodium bicarbonate, extracted with chloroform, etc., a yield of 3.7 gms. of "liberated" or hydrolyzed fraction was obtained.

The product of melting point 193–196° C. was recrystallized three times from ethanol and a new pure individual "liberated" alkaloid was obtained having a melting point of about 204–205° C. and $(\alpha)_D^{25} = +248.8$. This new "liberated" alkaloid was called erysodine.

During the first two recrystallizations of the product melting at 193–196° C., a small quantity of a white base did not dissolve. The insoluble material was filtered. It had a melting point of about 233–234° C. After recrystallization from a large volume of ethanol it showed melting point 240–241° C. $(\alpha)_D^{25} = +263.4$, 60% absolute ethanol and 40% glycerine by volume. It was pure erysopine, gave a green color when added to ferric chloride solution containing a drop of hydrochloric acid, and was identical with the erysopine previously obtained from erysothiopine.

Example IX

A quantity of about 28 gms. of crude hydrolyzed or "liberated" alkaloids derived from the 3250 gms. of seeds of *E. sandwicensis* Deg. described above were subjected to fractionation. After extraction with a hot mixture of 1200 ml. of anhydrous ether and 300 ml. of absolute ethanol, about 4 gms. of dark-colored insoluble material was filtered. The first crop from the filtrate yielded about 12 gms. of material melting at about 201–203° C. which on recrystallization yielded about 10.3 gms. of pure erysodine of melting point 204° C. and $(\alpha)_D + 248.6$. These constants were not changed by further recrystallizations. The second crop, of melting point 155° C., was treated with one liter of hot ether. The insoluble portion was filtered and the filtrate concentrated to 100 ml. The crystals (about 1.06 gms.) were filtered, and they melted at about 190° C. The filtrate was concentrated to 10 ml. and about 600 mg. of crystals melting at about 155° C. were obtained. On recrystallization from 400 ml. of ether, large prisms of melting point 172° C. and $(\alpha)_D + 252.2$, and small needles of melting point 162° C. and $(\alpha)_D + 239.1$, were obtained and readily separated. On further recrystallization, the prisms yielded pure erysovine of melting point 178° C. and $(\alpha)_D + 252.2$. On further recrystallization, the needles yielded pure erysocine of melting point 162° C. and $(\alpha)_D + 235.6$.

Example X 25 ml. of the final solution derived from 3250 gms. of seeds of *E. sandwicensis* Deg., mentioned above, were treated with sufficient solid sodium hydroxide to give a 20% solution, allowed to stand at about 20–25° for 2 hours and then extracted repeatedly (about 10 times) with chloroform. A yield of about 1.07 gms. or 1.63%, of hydrolyzed or "liberated" fraction was obtained.

Example XI 200 gms. of seeds of *E. glauca* Willd. (Haigh 9170) were extracted by the "alternative" procedure. The 100 ml. of neutralized solution remaining after chloroform extraction of the "free" fraction, was treated with 1 ml. of concentrated hydrochloric acid, and refluxed for 5 minutes. The solution was cooled and alkalinized with sodium bicarbonate. It was repeatedly extracted with chloroform. The first chloroform extract was highly colored and during the second chloroform extraction, a white precipitate formed, which was filtered. After further repeated (eight) extractions of the filtrate with chloroform, a yield of about 677 mg. of "liberated" bases was obtained. The product yielded pure erysodine having a melting point of about 202–203° C. and showing $(\alpha)_D + 247.8$ on recrystallization from ethanol.

The water and chloroform-insoluble precipitate weighed about 1.5 gms. and had a melting point of about 240–242° C. $(\alpha)_D + 265.6$, 60 parts ethanol, 40 parts glycerine. After recrystallization from 300 ml. of absolute ethanol, it melted at 241–242° C. and showed $(\alpha)_D + 265.2$. An alcohol solution treated with a drop of ferric chloride and hydrochloric acid gave a green color. The product was the new individual "liberated" alkaloid erysopine.

Example XII 200 gms. of seeds of *E. berteroana* Urb. (9195) were extracted by the "alternative" procedure. The 128 ml. of solution remaining after separation of the "free" alkaloidal fraction was treated with 2.5 ml. of concentrated hydrochloric acid and refluxed for 5 minutes. The solution was cooled, treated with sodium bicarbonate, extracted repeatedly (10 times) with chloroform and yielded about 76.7 mg. of "liberated" bases. A second acid hydrolysis of the solution was made for 2 hours and after chloroform extraction an additional 234.5 mg. of bases were obtained. The total quantity of bases obtained was dissolved in 0.3 ml. of ethanol and after scratching the walls of the tube, crystals formed, yield, about 119.4 mg., melting point 175–176.5° C. After two recrystallizations, a yield of about 52.6 mg. of crystals were obtained which had a constant melting point of about 178–179.5 and $(\alpha)_D+252$, ethanol. This individual "liberated" alkaloid was erysovine.

*Example XIII*

630 gms. of seeds of *Erythrina americana* Mill. (Palaez 9185) were extracted by the "alternative" procedure. The 400 ml. of neutralized solution remaining after removal of the "free" alkaloidal fraction was treated with 8 ml. of concentrated hydrochloric acid and refluxed for five minutes. The solution was alkalinized with sodium bicarbonate, extracted with chloroform and about 694.2 mg. of bases were obtained. After six recrystallizations from ethanol, needles having a melting point of 160–161° C., and showing $(\alpha)_D+238.1$ were obtained. This new alkaloid was called erysocine. It did not give a color with ferric chloride solution.

A second hydrolysis of the solution remaining after the separation of the "free" fraction by the same method as described above, for 30 min., yielded about 500.3 mg. of bases from which crude erysodine was obtained.

A third hydrolysis of the solution for 45 min. caused some decomposition as evidenced by the formation of tar-like material. However, about 420.9 mg. of bases were obtained, which, on recrystallization, yielded pure erysodine of melting point about 202–204° C., $(\alpha)_D+249.3$.

A fourth hydrolysis of the solution about 1½ hours caused considerable tar formation. However, about 296.7 mg. of yellow bases were obtained after chloroform distillation, which yielded about 33 mg. of crude erysodine.

A fifth hydrolysis of the solution for two hours yielded about 479.8 mg. of a thin yellow oil which did not yield a crystalline product.

The total yield of hydrolyzed "liberated" bases which yielded crystalline products was 0.31%. The rate of hydrolytic liberation of erysodine from *Erythrina americana* Mill. was distinctly slower than from *Erythrina sandwicensis*.

*Example XIV*

8700 gms. of seeds of *Erythrina poeppigiana* (Walp.) O. F. Cook (Wortley 9241) were treated by the "preferred" procedure. The 7300 ml. of neutralized solution remaining after separation of the "free" alkaloidal fraction was treated with 146 ml. of concentrated hydrochloric acid and refluxed for about 1¼ hours. The solution was alkalinized with sodium bicarbonate, extracted continuously for a prolonged period (6 hours) with chloroform, and yielded about 82 gms. of hydrolyzed or "liberated" bases. This crude mixture was treated with 40 ml. of ethanol and about 46 gms. of crystallized bases, melting at about 163–165° C. were obtained. A second crop of crystals (yield 1.56 gms.) of melting point 199–201° C. was obtained. On recrystalliation of the first crop from ethanol, a yield of about 40 gms. of a product melting at about 160–162° C. was obtained. A second recrystallization yielded about 37.4 gms. of a product melting at about 160–162° C. The melting point did not change even though the product was still a mixture of bases, and therefore, 25 gms. were subjected to fractional crystallization.

The 25 gms. were treated with 1500 ml. of boiling anhydrous ether. Insoluble material A was filtered, the filtrate concentrated to 200 ml. and after recrystallization, about 8 gms. of pure erysocine of melting point 160–162° C., and $(\alpha)_D+223.6$ were obtained. The mother liquor contained essentially erysocine. The 16.3 gms. of insoluble material A was treated with about 500 ml. of boiling anhydrous ether, and about 11.8 gm. of insoluble material B was filtered. The filtrate C yielded about 3.63 gms. of pure erysocine, of melting point, 161–162° C.; $(\alpha)_D+234.6$, after concentration.

On standing, the mother liquor of the filtrate C yielded a second crop of mixed needles, and tiny granules. Some needles D were separated mechanically. The material B was treated with about 800 ml. of anhydrous ether to yield 6.5 gms. of insoluble material E, which was treated with 800 ml. of ether to yield about 3.77 gms. of insoluble material F. The treatment of F with 800 ml. of ether left about 1.23 gms. of insoluble material G of melting point 199–200° C. Recrystallization of G from alcohol yielded pure erysodine of melting point of about 201.5–202.5° C., and $(\alpha)_D+249.2$. Concentration of the soluble fractions corresponding to E, F, and G yielded a further quantity of erysodine, and from the mother liquor crops, mixtures of needles D and granules (erysodine) were obtained. Mechanical separation of the needles D and recrystallization thereof yielded pure erysovine of melting point 178° C., and $(\alpha)_D+253.3$.

Thus, from the 25 gms. of starting material subjected to fractional crystallization, yields of about 15 gms. of erysocine, 7.5 gms. of erysodine and 0.5 gm. of erysovine were obtained.

*Example XV*

200 gms. of seeds of *Erythrina poeppigiana* (Walp) O. F. Cook, (Wortley 9241) were treated for the production of the "free" alkaloidal fraction. The 256 ml. of solution remaining was treated with sodium hydroxide to make a 1% solution, and refluxed for 15 min.

The solution was neutralized with hydrochloric acid, then alkalinized with sodium bicarbonate, for liberation of the phenolic bases, extracted with chloroform, etc. The yield of bases was about 100 mg. The hypaphorine present in the seed powder underwent decomposition during the refluxing, as was evidenced by an odor of trimethylamine.

Another 256 ml. portion of solution was treated with sodium hydroxide for a 4% solution and refluxed for 30 minutes. The odor of trimethylamine from the decomposing hypaphorine was very pronounced. After treatment as above, the yield of bases was about 649 mg. An acid hydrolysis for a similar time would yield about three times the quantity of hydrolyzed alkaloids.

*Example XVI*

Extracts of the following species exhausted of the "free" alkaloidal fraction have also been subjected to acid or alkaline hydrolysis to yield "liberated" alkaloids.

| Specie | Collectors' names¹—Specimens numbers |
|---|---|
| E. abysinnica Lam. | Krukoff 9179. |
| E. acanthocarpa E. Mey. | Everitt 9198. |
| E. arborescens Roxb. | Ghose 9228. |
| E. dominiguezii Hassler | Schulz 9198/1569. |
| E. flabelliformis Kearney | Jones 9154. |
| E. folkersii Kruk. and Mold. | For. dept. 9167. |
| E. fusca Lour. | Tamesis 9345. |
| E. griesebachii Urb. | Walsingham 9316. |
| E. herbacea L. | Brazol 9144, Jordan 9155. |
| E. macrophylla DC. | Armstrong 0442/52+53. |
| E. pallida Britton & Rose. | Wortley 9257. |
| E. rubrinervia H. B. K. | Jaramildo 9181. |
| E. senegalensis DC. | For. Service 9202. |
| E. costaricensis Micheli. | Niehaus 9200. |
| E. subumbrans (Hassk.) Merr. | Holttum 9204/34801. |
| E. standleyana Kruk. | Acuna 9235. |
| E. variegata L. | Smith 9176. |
| Do. | Balaev 9220, Haigh 9172, Acuna 9164. |
| E. velutina Willd. | Rocha 9272. |
| Do. | Vasconcellos Sobrinho 9263. |
| E. vespertilio Benth. | For. Dept. 9180. |

¹ Specimens are deposited in the New York Botanical Gardens, New York, N. Y.

In some cases, where the "free" alkaloidal fraction is produced from the seeds of Erythrina by the "alternative" procedure, i. e., with intermediate separation of the known physiologically inert alkaloid, hypaphorine, the acid condition exists for a relatively prolonged period for the crystallization of the hypaphorine salt, and in that case, the combined alkaloids may be hydrolyzed to a certain extent at that point. The hydrolyzed portion then possesses the properties of the "free" alkaloid fraction and is isolated simultaneously with the latter by extraction with chloroform. Such hydrolyzed or "liberated" alkaloids may be separated from the "free" fraction, and the following example illustrates a method by which this may be accomplished.

*Example XVII*

3 kg. of powdered seeds of *Erythrina sandwicensis* Deg. (L. W. Bryan 9160) were extracted to remove the fatty portion, and the defatted powdered portion was then extracted with ethanol. The ethanol extractives were dissolved in 2 liters of water containing 40 ml. of concentrated hydrochloric acid. The solution was clarified, concentrated in vacuo, subjected to cold, and about 28.2 gms. of hypaphorine hydrochloride were filtered. The filtrate was alkalinized with sodium bicarbonate and extracted with chloroform. The chloroform was distilled and the residue weighed about 13.6 gms. It was treated with 15 ml. of absolute ethanol, about 6.9 gms. of sodium iodide, and about 2.25 gms. of glacial acetic acid. The mixture yielded about 8.2 gms. of crude erythramine hydroiodide, an individual "free" alkaloid. The mother liquor was freed of alcohol, and the residue was dissolved in water. The solution was alkalinized with sodium bicarbonate and extracted repeatedly (10 times) with chloroform. The chloroform was distilled and the residue, weighing about 1.2 gms. was again converted to the iodides. No crystalline material was obtained. The bases were recovered. Yield, about 871.1 mg. That residue was dissolved in 5 ml. of 12% hydrogen chloride in ethanol. The product formed white crystals (needles); yield, about 784.1 mg; melting point 191° C. It was essentially crude erysodine but probably contained some erysocine and/or erysovine. After several (5) recrystallizations from ethanol, crystals of constant melting point 204–205° C. were obtained, showing $(\alpha)_D^{27} +248$. The product was halogen-free and was too weak to form a hydrochloride. It was pure erysodine.

What is claimed is:

1. A substance selected from the group of "liberated" alkaloids identical with the "liberated" alkaloids obtained from species of Erythrina containing such alkaloids, and consisting of the "liberated" alkaloidal fraction, the alkaloid erysodine which in its pure form has a melting point of about 202–205° C.; the alkaloid erysopine which in its pure form has a melting point of about 240–242° C.; the alkaloid erysocine which in its pure form has a melting point of about 160–162° C.; and the alkaloid erysovine which in its pure form has a melting point of about 177–179° C.

2. Erysodine, a "liberated" alkaloid identical with the alkaloid erysodine obtained from species of Erythrina containing said alkaloid, and which in its pure form has a melting point of about 202–205° C.

3. Erysopine, a "liberated" alkaloid identical with the alkaloid erysopine obtained from species of Erythrina containing said alkaloid, and which in its pure form has a melting point of about 240–242° C.

4. The "liberated" alkaloidal fraction identical with the "liberated" alkaloidal fraction obtained from species of Erythrina containing the same.

5. The process comprising hydrolyzing "combined" alkaloids, which are identical with the "combined" alkaloids obtained from species of Erythrina containing the same, and selected from the group consisting of the "combined" alkaloidal fraction, the alkaloid erysothiopine which in pure form has a melting point of about 168–169° C., and the alkaloid erysothiovine which in pure form has a melting point of about 186–187° C.

6. The process comprising hydrolyzing, in acid medium, "combined" alkaloids which are identical with the "combined" alkaloids obtained from species of Erythrina containing the same, and selected from the group consisting of the "combined" alkaloidal fraction, the alkaloid erysothiopine, which in pure form has a melting point of about 168–169° C., and the alkaloid erysothiovine which in pure form has a melting point of about 186–187° C.

7. The process comprising hydrolyzing the "combined" alkaloid erysothiovine, identical with the alkaloid erysothiovine obtained from species of Erythrina containing said alkaloid, which erysothiovine in pure form has a melting point of about 186–187° C.

8. The process comprising hydrolyzing, in acid medium, the "combined" alkaloid erysothiovine, identical with the alkaloid erysothiovine obtained from species of Erythrina containing said alkaloid, which erysothiovine in pure form has a melting point of about 186–187° C.

9. The process comprising hydrolyzing the "combined" alkaloid erysothiopine, identical with the alkaloid erysothiopine obtained from species of Erythrina containing said alkaloid, which erysothiopine in pure form has a melting point of about 168–169° C.

10. The process comprising hydrolyzing, in acid medium, the "combined" alkaloid erysothiopine, identical with the alkaloid erysothiopine obtained from species of Erythrina containing said alkaloid, which erysothiopine in pure form has a melting point of about 168–169° C.

11. The process comprising hydrolyzing "combined" alkaloids identical with the "combined" alkaloids obtained from species of Erythrina containing said alkaloids, separating the "liberated" alkaloids thus obtained, and recovering the alkaloid erysodine, which in pure form has a melting point of about 202–205° C.

12. The process comprising hydrolyzing "combined" alkaloids identical with the "combined" alkaloids obtained from species of Erythrina containing said alkaloids, separating the "liberated" alkaloids thus obtained, and recovering the alkaloid erysopine, which in pure form has a melting point of about 240–242° C.

13. The process comprising hydrolyzing "combined" alkaloids identical with the "combined" alkaloids obtained from species of Erythrina containing said alkaloids, and recovering the "liberated" alkaloids thus obtained.

14. The process comprising hydrolyzing, in acid medium, "combined" alkaloids identical with the "combined" alkaloids obtained from species of Erythrina containing said alkaloids, and recovering the "liberated" alkaloids thus obtained.

15. The process comprising hydrolyzing, in acid medium, "combined" alkaloids identical with the "combined" alkaloids obtained from species of Erythrina containing said alkaloids, separating the "liberated" alkaloids thus obtained, and recovering the alkaloid erysodine, which in pure form has a melting point of about 202–205° C.

16. The process comprising hydrolyzing, in acid medium, "combined" alkaloids identical with the "combined" alkaloids obtained from species of Erythrina containing said alkaloids, separating the "liberated" alkaloids thus obtained, and recovering the alkaloid erysopine, which in pure form has a melting point of about 240–242° C.

KARL FOLKERS.
FRANK KONIUSZY.